US009122809B2

(12) United States Patent
Cartes et al.

(10) Patent No.: US 9,122,809 B2
(45) Date of Patent: Sep. 1, 2015

(54) SEGMENTING BUS TOPOLOGY

(75) Inventors: Andrew Cartes, Cypress, TX (US);
Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 950 days.

(21) Appl. No.: 13/000,246

(22) PCT Filed: Jul. 1, 2008

(86) PCT No.: PCT/US2008/068876
§ 371 (c)(1),
(2), (4) Date: Dec. 20, 2010

(87) PCT Pub. No.: WO2010/002397
PCT Pub. Date: Jan. 7, 2010

(65) Prior Publication Data
US 2011/0113179 A1    May 12, 2011

(51) Int. Cl.
*G06F 13/40*    (2006.01)
(52) U.S. Cl.
CPC .................... *G06F 13/4022* (2013.01)
(58) Field of Classification Search
CPC .................... G06F 13/4022; G06F 13/4027
USPC .................... 710/305, 306, 316, 317
See application file for complete search history.

(56) References Cited

U.S. PATENT DOCUMENTS

| | | | | |
|---|---|---|---|---|
| 4,583,088 A * | 4/1986 | Bux et al. | ...................... | 370/449 |
| 5,847,580 A * | 12/1998 | Bapat et al. | ..................... | 326/82 |
| 5,892,933 A * | 4/1999 | Voltz | .............................. | 710/316 |
| 6,233,635 B1 * | 5/2001 | Son | ................. | 710/315 |
| 6,363,067 B1 * | 3/2002 | Chung | ......................... | 370/364 |
| 6,405,299 B1 * | 6/2002 | Vorbach et al. | .................. | 712/11 |
| 6,597,197 B1 * | 7/2003 | Mosley et al. | ................... | 326/63 |
| 6,622,188 B1 * | 9/2003 | Goodwin et al. | ............ | 710/105 |
| 6,725,320 B1 * | 4/2004 | Barenys et al. | ............... | 710/316 |
| 6,745,270 B1 * | 6/2004 | Barenys et al. | ............... | 710/104 |
| 6,816,939 B2 * | 11/2004 | Bandholz et al. | ............. | 710/305 |
| 6,871,253 B2 * | 3/2005 | Greeff et al. | .............. | 710/316 |
| 6,874,050 B2 * | 3/2005 | Tangen | ........................ | 710/300 |
| 6,880,133 B2 * | 4/2005 | Meyer et al. | .................. | 716/114 |
| 7,003,563 B2 * | 2/2006 | Leigh et al. | ................... | 709/223 |
| 7,016,981 B2 * | 3/2006 | Ervin | ................................ | 710/1 |
| 7,028,209 B2 * | 4/2006 | Mosley et al. | ................ | 713/500 |
| 7,036,033 B1 * | 4/2006 | Price | ............................. | 713/340 |
| 7,085,863 B2 * | 8/2006 | Barenys et al. | ............... | 710/104 |
| 7,092,041 B2 * | 8/2006 | Lendaro | ........................ | 348/705 |
| 7,149,838 B2 * | 12/2006 | Ervin | ......................... | 710/306 |
| 7,308,705 B2 | 12/2007 | Gordy et al. | | |
| 7,360,007 B2 * | 4/2008 | Edirisooriya et al. | ........ | 710/307 |
| 7,586,943 B2 * | 9/2009 | Pappalardo et al. | .......... | 370/466 |
| 7,814,249 B2 * | 10/2010 | Seo | ................. | 710/110 |
| 7,863,778 B2 * | 1/2011 | Flynn et al. | ................... | 307/140 |

(Continued)

OTHER PUBLICATIONS

"Hardware/Software Tradeoffs: A General Design Principle?"; 3 pages, dated Jan. 25, 1985.*

(Continued)

*Primary Examiner* — Brian Misiura
(74) *Attorney, Agent, or Firm* — Law Office of Phillip Scott Lyren

(57) ABSTRACT

One embodiment is a method that segments a bus topology to increase addressable devices that can attach to a bus. Switching occurs between different segments on the bus having multiple bus segments linked together.

16 Claims, 9 Drawing Sheets

(56) References Cited

U.S. PATENT DOCUMENTS

| | | | |
|---|---|---|---|
| 7,979,621 B2* | 7/2011 | Gregg | 710/316 |
| 8,082,381 B2* | 12/2011 | Reddy et al. | 710/316 |
| 2003/0118046 A1 | 6/2003 | Chao | |
| 2003/0217347 A1 | 11/2003 | Meyer et al. | |
| 2004/0218629 A1 | 11/2004 | Pappalardo et al. | |
| 2008/0034122 A1 | 2/2008 | Kubo et al. | |
| 2011/0138097 A1* | 6/2011 | Nakajima et al. | 710/316 |

OTHER PUBLICATIONS

International Search Report and Written Opinion, dated Mar. 31, 2009, 11 pages.

* cited by examiner

| Bus | (links) | Primitive |
|---|---|---|
| 0 | | |
| 1 | | |
| 2 | | |
| 3 | | |
| 4 | (not shown) | |
| 5 | (not shown) | |
| 6 | (3) | mux1 [A] |
| 7 | (3) | mux1 [B] |
| 8 | (6) | mux2 [A] |
| 9 | (6) | mux2 [B] |
| 10 | (6) | mux2 [C] |
| 11 | (6) | mux2 [D] |
| 12 | (8) | mux3 [A] |
| 13 | (8) | mux3 [B] |
| 14 | (8) | mux3 [C] |
| 15 | (8) | mux3 [D] |
| 16 | (9) | mux4 [A] |
| 17 | (9) | mux4 [B] |
| 18 | (9) | mux4 [C] |
| 19 | (9) | mux4 [D] |
| 20 | (10) | mux5 [A] |
| 21 | (10) | mux5 [B] |
| 22 | (10) | mux5 [C] |
| 23 | (10) | mux5 [D] |

| Bus | (links) | Primitive |
|---|---|---|
| 24 | (11) | mux6 [A] |
| 25 | (11) | mux6 [B] |
| 26 | (11) | mux6 [C] |
| 27 | (11) | mux6 [D] |
| 28 | (7) | mux7 [A] |
| 29 | (7) | mux7 [B] |
| 30 | (7) | mux7 [C] |
| 31 | (7) | mux7 [D] |
| 32 | (28) | mux8 [A] |
| 33 | (28) | mux8 [B] |
| 34 | (28) | mux8 [C] |
| 35 | (28) | mux8 [D] |
| 36 | (29) | mux9 [A] |
| 37 | (29) | mux9 [B] |
| 38 | (29) | mux9 [C] |
| 39 | (29) | mux9 [D] |
| 40 | (30) | mux10 [A] |
| 41 | (30) | mux10 [B] |
| 42 | (30) | mux10 [C] |
| 43 | (30) | mux10 [D] |
| 44 | (31) | mux11 [A] |
| 45 | (31) | mux11 [B] |
| 46 | (31) | mux11 [C] |
| 47 | (31) | mux11 [D] |

FIG. 2B

| bus | Primitives |
|---|---|
| 0 | |
| 1 | |
| 2 | |
| 3 | |
| 4 | (not shown) |
| 5 | (not shown) |
| 6 | bus 3 \| mux1 [A] |
| 7 | bus 3 \| mux1 [B] |
| 8 | bus 3 \| mux1 [A] \| mux2 [A] |
| 9 | bus 3 \| mux1 [A] \| mux2 [B] |
| 10 | bus 3 \| mux1 [A] \| mux2 [C] |
| 11 | bus 3 \| mux1 [A] \| mux2 [D] |
| 12 | bus 3 \| mux1 [A] \| mux2 [A] \| mux3 [A] |

FIG. 3A

| bus | Primitives |
|---|---|
| 13 | bus 3 \| mux1 [A] \| mux2 [A] \| mux3 [B] |
| 14 | bus 3 \| mux1 [A] \| mux2 [A] \| mux3 [C] |
| 15 | bus 3 \| mux1 [A] \| mux2 [A] \| mux3 [D] |
| 16 | bus 3 \| mux1 [A] \| mux2 [B] \| mux4 [A] |
| 17 | bus 3 \| mux1 [A] \| mux2 [B] \| mux4 [B] |
| 18 | bus 3 \| mux1 [A] \| mux2 [B] \| mux4 [C] |
| 19 | bus 3 \| mux1 [A] \| mux2 [B] \| mux4 [D] |
| 20 | bus 3 \| mux1 [A] \| mux2 [C] \| mux5 [A] |
| 21 | bus 3 \| mux1 [A] \| mux2 [C] \| mux5 [B] |
| 22 | bus 3 \| mux1 [A] \| mux2 [C] \| mux5 [C] |
| 23 | bus 3 \| mux1 [A] \| mux2 [C] \| mux5 [D] |
| 24 | bus 3 \| mux1 [A] \| mux2 [D] \| mux6 [A] |
| 25 | bus 3 \| mux1 [A] \| mux2 [D] \| mux6 [B] |

FIG. 3B

| bus | Primitives | | | |
|---|---|---|---|---|
| 26 | bus 3 | mux1 [A] | mux2 [D] | mux6 [C] |
| 27 | bus 3 | mux1 [A] | mux2 [D] | mux6 [D] |
| 28 | bus 3 | mux1 [B] | mux7 [A] | |
| 29 | bus 3 | mux1 [B] | mux7 [B] | |
| 30 | bus 3 | mux1 [B] | mux7 [C] | |
| 31 | bus 3 | mux1 [B] | mux7 [D] | |
| 32 | bus 3 | mux1 [B] | mux7 [A] | mux8 [A] |
| 33 | bus 3 | mux1 [B] | mux7 [A] | mux8 [B] |
| 34 | bus 3 | mux1 [B] | mux7 [A] | mux8 [C] |
| 35 | bus 3 | mux1 [B] | mux7 [A] | mux8 [D] |
| 36 | bus 3 | mux1 [B] | mux7 [B] | mux9 [A] |
| 37 | bus 3 | mux1 [B] | mux7 [B] | mux9 [B] |
| 38 | bus 3 | mux1 [B] | mux7 [B] | mux9 [C] |
| 39 | bus 3 | mux1 [B] | mux7 [B] | mux9 [D] |
| 40 | bus 3 | mux1 [B] | mux7 [C] | mux10[A] |
| 41 | bus 3 | mux1 [B] | mux7 [C] | mux10[B] |
| 42 | bus 3 | mux1 [B] | mux7 [C] | mux10[C] |
| 43 | bus 3 | mux1 [B] | mux7 [C] | mux10[D] |
| 44 | bus 3 | mux1 [B] | mux7 [D] | mux11[A] |
| 45 | bus 3 | mux1 [B] | mux7 [D] | mux11[B] |
| 46 | bus 3 | mux1 [B] | mux7 [D] | mux11[C] |
| 47 | bus 3 | mux1 [B] | mux7 [D] | mux11[D] |

FIG. 3C

| segment | parent | primitive |
|---|---|---|
| 0 | 0xFF | not applicable |
| 1 | 0xFF | not applicable |
| 2 | 0xFF | not applicable |
| 3 | 0xFF | not applicable |
| 4 | 0 | Type: GPO, clear 0x3, set 0x0 |
| 5 | 0 | Type: GPO, clear 0x3, set 0x1 |
| 6 | 0 | Type: GPO, clear 0x3, set 0x2 |
| 7 | 0 | Type: GPO, clear 0x3, set 0x3 |

| seg | parent |
|-----|--------|
| 0 | |
| 1 | |
| 2 | |
| 3 | |
| 4 | 0 |
| 5 | 0 |
| 6 | 0 |
| 7 | 0 |
| 8 | 3 |
| 9 | 3 |
| 10 | 3 |
| 11 | 3 |

SEGMENTING BUS TOPOLOGY

FIELD OF THE INVENTION

The present invention relates to systems and methods for segmenting bus topology and more particularly to segmenting a bus to increase addressable devices attached to the bus.

BACKGROUND

Computer bus architectures can only support a limited number of attached nodes. For example, I2C (Inter-Integrated Circuit) buses use a 7-bit address space with 16 reserved addresses. These buses provide a maximum of 112 nodes that communicate on a same bus.

The use of I2C for system devices is reaching a stage where addressing concerns will limit the number of devices on the same bus. Such limitations will cause significant problems for systems requiring a large number of addressable devices.

BRIEF DESCRIPTION OF THE DRAWINGS

FIG. 2B shows an exemplary switching table that indicates the step(s) to take to address a desired bus segment in accordance with an exemplary embodiment.

FIG. 3A shows a first part of a data structure for the bus topology of FIG. 2A in accordance with an exemplary embodiment.

FIG. 3B shows a second part of a data structure for the bus topology of FIG. 2A in accordance with an exemplary embodiment.

FIG. 3C shows a third part of a data structure for the bus topology of FIG. 2A in accordance with an exemplary embodiment.

DETAILED DESCRIPTION

Figure 1:
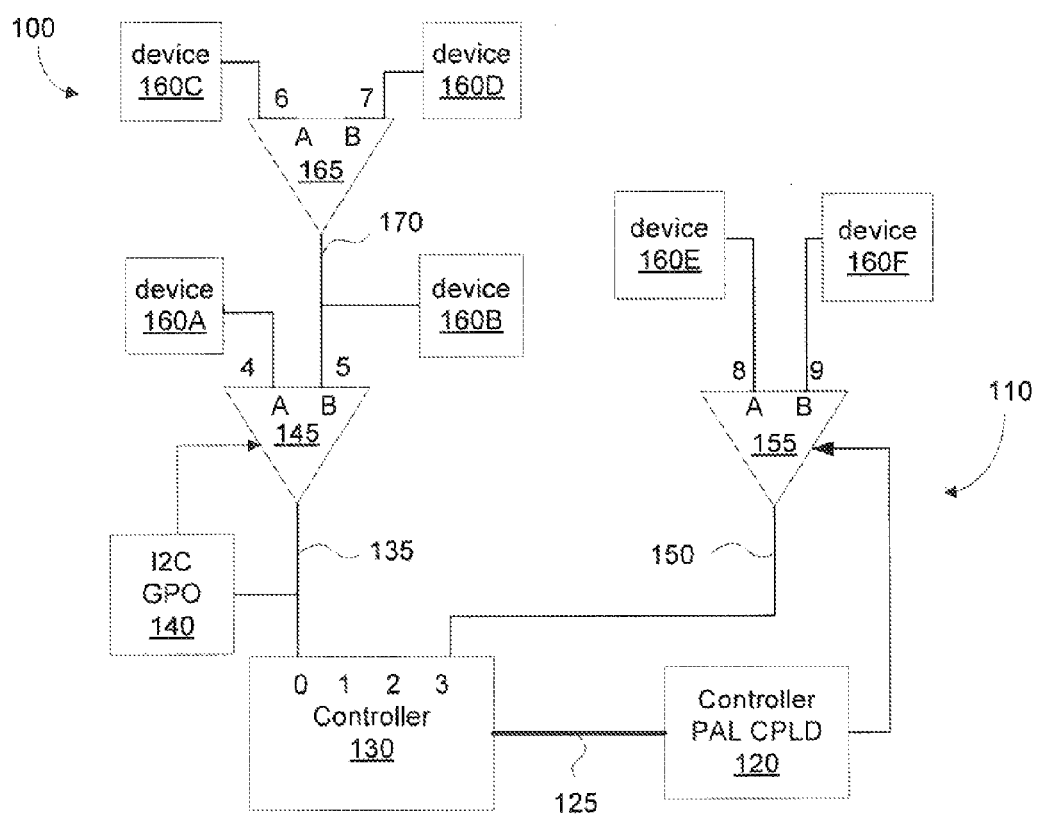
FIG. 1 shows an exemplary bus topology 100 using various switching techniques for a segmented bus in accordance with an exemplary embodiment.

Exemplary embodiments in accordance with the invention relate to systems and methods for segmenting bus topology to increase addressable devices that can attach to the bus.

One exemplary embodiment uses a segmented I2C architecture where multiple segments are linked together at the same time, but all segments are not simultaneously accessible. Platform hardware uses switches (such as multiplexers) to switch between different bus segments. Furthermore, the method to organize, switch, and manage the bus topology, including variable complexities of topology, is used by embedded processors or controllers, such as Integrated Lights-Out (iLO) for access to I2C devices in the system.

Exemplary embodiments provide a method and system to organize and optimize multiple segmented buses. For example, exemplary methods and apparatus include one or more of the following: assigning an enumerated segment number to each segment in the system that is used to locate a target device; assigning devices to the segments; using primitives as descriptions of zero or more switching operations needed to switch to a segment that describes the nature of the switching (which can include, but is not limited to, use of general-purpose control bits (GPO bits), inline I2C multiplexers, I2C expander control bits, and CPLD controls); using potential optimizations that determine if switching operations can be avoided in order to address a segment; and using optimization work-arounds wherein different segment aliases are used to prevent optimizations.

One exemplary embodiment uses a data structure to represent the segmented implementation of the system. The embodiment includes methods (primitives) that switch between the segments and describe the hierarchy/topology of the implementation and multiplexer ordering rules. For each system segment, the data structure lists primitives needed to switch to that segment. Multiple primitives are used in complex topologies, and the order that the primitive dependencies (other primitives) are processed is required for proper operation. Other data structures such as Sensor Data Records that describe target devices use a consistent segment number, so that the switching primitives are processed before communicating to the device. The data structures are used by system software and management processors (such as iLO) to switch between segments in order to communicate with devices on the segment. Optimizations allow the processors to reduce or eliminate unnecessary switching operations when a target device is already on an addressable segment and to reduce unnecessary switching operations when targeting a new segment that shares a full or partial route. Optimizations can be avoided, forcing primitives processing, by putting devices on different logical segments that share similar switching primitives: because the logical segments are different, optimizations would be avoided.

Primitives associated with a given segment describe the steps needed to switch to that segment. These steps can include the use of general-purpose I/O bits, inline I2C multiplexers, system CPLD/PAL glue logic, and other extensions needed as systems are designed. The primitives describe the address, byte offset, bit mask, bitwise operation, and positive or negative logic used to perform the switch. Primitives can indicate that the segment is a "root" segment directly connected to the controller. Primitives can also indicate that the segment is an alternate to I2C, such as PECI (Platform Environment Control Interface), which has similar addressing and protocol concerns, but a different hardware transport.

As discussed in more detail below, exemplary embodiments provide a segmented topology, so that software that uses the topology does not need to be constructed with prior knowledge. In one embodiment, the data structure is carried or stored by the host platform so that system software, firmware, and processor do not need to carry the data. Optimizations are made to reduce unnecessary switching. The optimizations are based on data in the data structure. The optimizations can be avoided by constructing the data structure so that optimizations are not evident. Furthermore, flexibility between data size and code size trade-offs is provided. The primitives in the data structure provide for multiple different switching paths or alternatives along the bus. The primitives can describe segments such as I2C or PECI used by the controller for communication.

FIG. 1 shows an exemplary bus topology 100 using various switching techniques for a segmented bus in accordance with an exemplary embodiment.

By way of example, the bus topology uses a segmented I2C bus 110 with multiple segments, levels, multiplexers (muxes), and selection mechanisms. For illustration, a controller PAL CPLD 120 connects through an expansion bus 125 to a processor or controller 130 (such as iLO). The controller 130 couples via a first bus segment 135 to an I2C GPO 140 and multiplexer 145, and couples via a second bus segment 150 to multiplexer 155. The multiplexer 145 in turn couples to a first device 160A, second device 160B, and another multiplexer 165 via another bus segment 170 to two devices 160C and 160D. The multiplexer 155 couples to two devices 160E and 160F.

I2C segments (such as 135, 150, 170) are enumerated at each node by first enumerating the segments starting from the controller 130, and then descending the lowest numbered segment. Each segment has a unique segment number for addressing purposes. For example, segment 170 has a segment number of 5. This number is an exemplary convention and not a requirement for enumeration. In one exemplary embodiment, bus segments directly connected to the controller 130 are assumed to correspond with the controller instance number (engine/bus number). In one embodiment, all segments are uniquely numbered.

Exemplary embodiments support a wide variety of mechanisms to switch a multiplexer. In general, the term "upstream" refers to segments closer to controller 130, and the term "downstream" refers to segments farther away (higher numbered) from the controller. Furthermore, the term "inline" implies that the mux is addressable at the same time as the desired segment.

By way of example, device 140 is shown as an I2C GPO expander (shown from bus 0 of processor 130 to segment 4, 5). An I2C device can addressable and support multiple general-purpose-output pins that can be routed to a mux that is switched using external discrete logic.

As another example, I2C inline multiplexer is shown from bus 5 to segment 6, 7. The I2C mux can be an I2C addressable device enabling switching between downstream segments. In one exemplary embodiment, the mux itself requires an I2C device address. It is implicit that the mux is addressable in order to select downstream segments. In an implementation with cascading muxes, the upstream inline mux is selected prior to the downstream mux.

As another example, General-Purpose Output bits are shown from bus 3 to segment 8, 9. Here, a mux can be selected using general-purpose-output pins. The pins are sourced from the controller PAL CPLD 120 or also from GPO bits and scan-chain.

Exemplary embodiments use a switching primitive to select a connection on a mux. Primitives can have dependencies that process before the operation described by the primitive. The target I2C segment associated with the primitive is addressable on a controller bus after the necessary switching primitives are completed. Some segments can require processing multiple primitives to complete needed switching.

A primitive contains basic data used by controller to select the segment and includes:
(1) Type that indicates the control being used such as I2C, CPLD, scan chain, GPO.
(2) Address that locates the data being changed.
(3) Offset (in bytes) to the data at the address.
(4) Mask that identifies the bit(s) being changed.
(5) Operation that indicates whether bitwise AND or OR is used.
(6) Sign that indicates if positive (bit set) or negative (bit clear) logic is used.

Figure 2A:
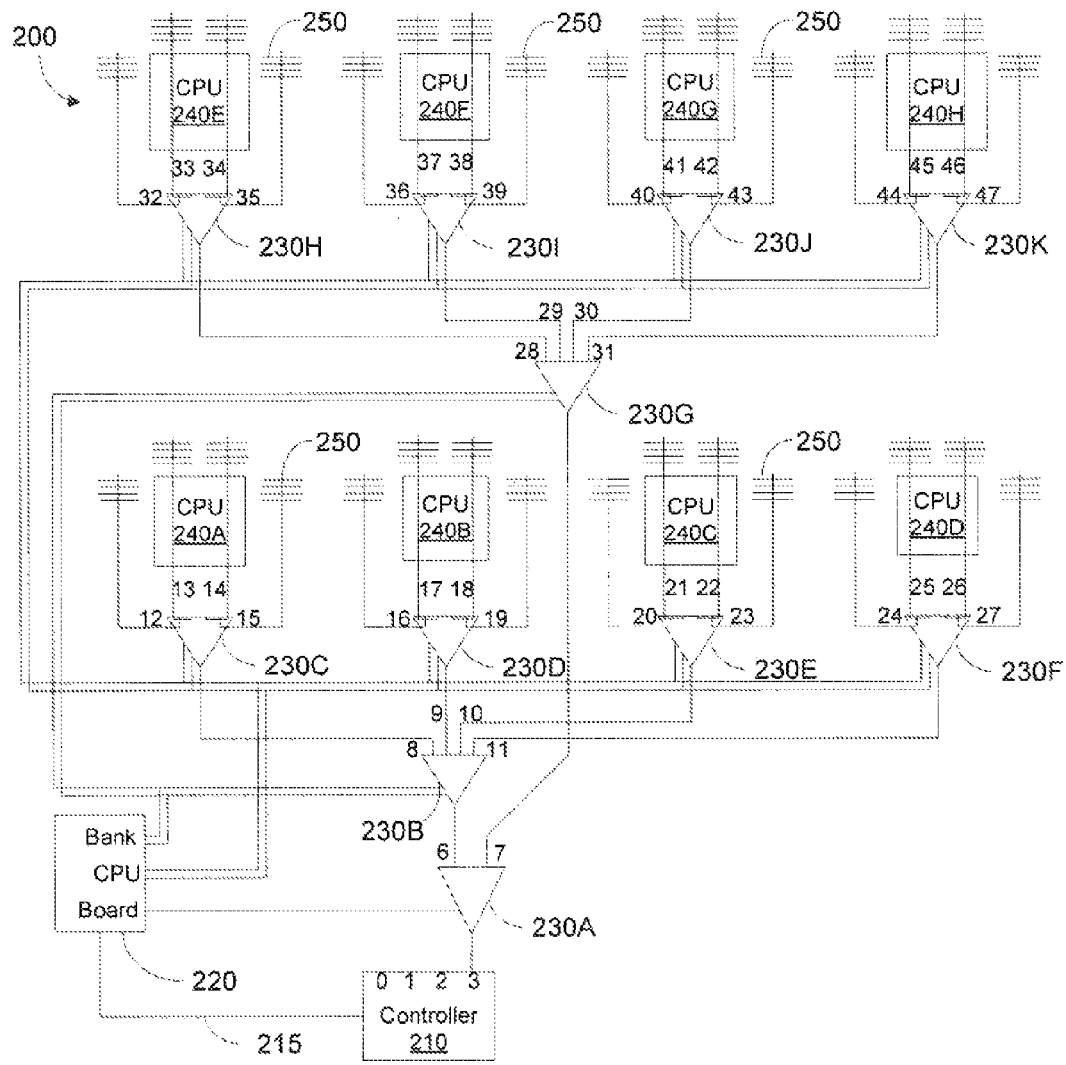
FIG. 2A shows an exemplary bus topology to address up to 128 devices in accordance with an exemplary embodiment.

FIG. 2A shows an exemplary bus topology 200 to address up to 128 devices, such as 128 DIMMs (dual in-line memory module). The exemplary layout is dictated by chipset and memory reference code constraints (MRC—part of the system ROM). Different MUX implementations and depths could be used, resulting in different segmenting.

The bus topology 200 includes a controller 210 that couples through an expansion bus 215 to a CPLD 220 and a plurality of multiplexers (shown as 230A-230K). The topology also includes eight central processing units (CPUs, shown as 240A-240H) and 128 devices (some being shown as 250).

FIG. 2B shows an exemplary switching table that indicates the step(s) to take to address a desired bus segment. Each segment is selected using the primitives listed. For a given segment, additional dependencies (to address upstream segments) may be listed, until no more remain.

For example, to address a DIMM on segment 40 the following is shown:

40

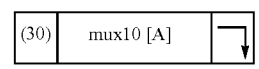

implying that 30 is a dependency as follows:

30

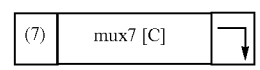

implying that 7 is a dependency as follows:

7

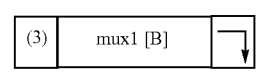

implying that 3 is a dependency as follows:

3

implying no more dependencies and that bus (3) is used for the transaction.

To process, the following steps would apply in this order:
1. Bus (3) will be used
2. Switch mux 230A to channel B (address segment 3, 7)
3. Switch mux 230G to channel C (address segment 3, 7, 30)
4. Switch mux 230J to channel A (address segment 3, 7, 30, 40)
5. Conduct transaction to any nodes on segment 40.

Discussion now addresses linked primitive order. When processing linked primitives, the list of switching primitives is built by traversing back (upstream) from the target segment, and then performing the switching in a forward (downstream)

order. This may not be necessary depending on the type of muxes used, but this method will work regardless of the type of muxes used. Inline muxes require switching in downstream order, from the controller to the target segment.

Regarding resource usage of linked primitives, assuming that a dependency is represented as 1 byte and a switching primitive is 4 bytes, for a 48 segment implementation the memory requirements are as follows:

(segments)*(dependency bytes+primitive bytes)=table bytes 48*(1+4)=240 bytes.

As shown, 240 bytes are used to maintain a switching table for a 48-segment topology.

In the linked primitive implementation shown in FIG. 2A, the data is fairly simple, but the software implementation might be more complicated. In order to simplify the software, another approach with more data could be used, shown in the exemplary switching tables of FIGS. 3A-3C.

FIGS. 3A-3C use the same bus topology shown in FIG. 2A. The different switching tables are used to eliminate a need to follow links between primitives. Instead, 0 or more primitives are used to switch to a given segment, and additionally, the controller I2C master is included in the list of primitives.

These tables represent the existences of an expanded primitive order. Specifically, expanded primitives are recorded in the order that they are processed. This simplifies the software implementation when compared to the exemplary embodiment of tables of FIG. 2B, and requires that the data structure is correctly organized, representing a trade-off in code versus data complexity.

For the embodiment using tables of FIGS. 3A-3C, all muxes can be switched using peripheral (CPLD) logic controls as opposed to inline multiplexers. This means that the intermediate segments do not require explicit enumeration because they are always switchable. Likewise, primitives do not need to be processed in order.

With exemplary embodiments, resource usage of expanded primitives depends on the depth of layers. In other words, assuming that a switching primitive is 4 bytes, the storage requirements for expanded primitives depends on the number of layers deep. The data structure of the switching table is simplest if each record is a fixed size, based on the number of switching levels. For the 48 segment implementation shown, with 3 levels of muxes, the memory requirements are as follows:

(segments)*(levels)*(dependency bytes)=table bytes 48*3*4=576 bytes.

As shown, 576 bytes are used to maintain a switching table for a 48-segment topology. This is 2.4 times larger than the 240 bytes with the linked primitives table for the same topology.

With exemplary embodiments, several optimizations can be used to reduce overhead when switching a complex topology. Target device optimization is one example. Here, a transaction to a device on a segment along the path to the current segment does not require a procedure to switch to the current segment. This case may be unlikely in that most devices will probably be located on the downstream "leaves" and not along the upstream path.

Target device optimization by traversing the switching table is another example. Here, the determination of when such an optimization is used can occur by traversing the switching table and determining if the target resides on the path to a segment that is already switched.

Target device optimization by maintaining a switching cache is yet another example. Here, an alternative optimization is to maintain a cache of each switching level. In this example, there are three switching levels (nested muxes), so if the target segment is maintained in the cache at a given level as well as all upstream levels, no switching needs to occur.

Target mux optimization is yet another example. Here, when switching to a new segment, it is unnecessary to switch upstream muxes that already have the correct selection. This determination can be made by traversing the switching table or by referencing the switching cache.

Figures 4A, 4B:
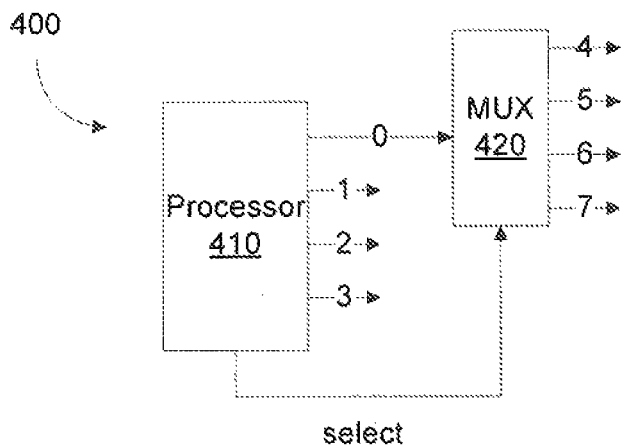
FIG. 4A shows an exemplary multiplexed bus topology in accordance with an exemplary embodiment.
FIG. 4B shows a corresponding data structure for FIG. 4A in accordance with an exemplary embodiment.

FIG. 4A shows an exemplary multiplexed bus topology 400, and FIG. 4B shows the corresponding data structure.

In the example, a management processor 410 couples to a mux 420 and supports eight bus segments. Four root segments are direct, and four segments are connected using a multiplexer (mux) on segment 0.

The data structure in FIG. 4B describes the segments in the system. Root segments directly connected to the processor 410 are identified using an indicator such as "parent segment 0xFF" in the data structure. Bus transactions are normally initiated at the processor.

For example, to transact to a device on segment 6,
1) software requests segment 6 transaction to device
2) algorithm is used:
   a. identify root as engine 0
   b. switch MUX to segment 6 using primitive
   c. store "history" as segment 6
3) transaction is performed on root engine 0.
To transact to a device on segment 2
4) software requests segment 2 transaction to device
5) algorithm is used:
   a. segment 2 is a root engine
6) transaction is performed on root engine 2.
To transact to a device on segment 6,
7) software requests segment 6 transaction to device
8) algorithm is used:
   a. identify root as engine 0
   b. history: mux is already on segment 6
9) transaction is performed on root engine 0.
To transact to a device on segment 7,
10) software requests segment 7 transaction to device
11) algorithm is used:
   a. identify root as engine 0
   b. history: not segment 7
   c. switch MUX to segment 7
   d. store "history" as segment 6
12) transaction is performed on engine 0.

For leaf segments, the data describes the path to the processor and the associated primitive.

Figures 5A, 5B:
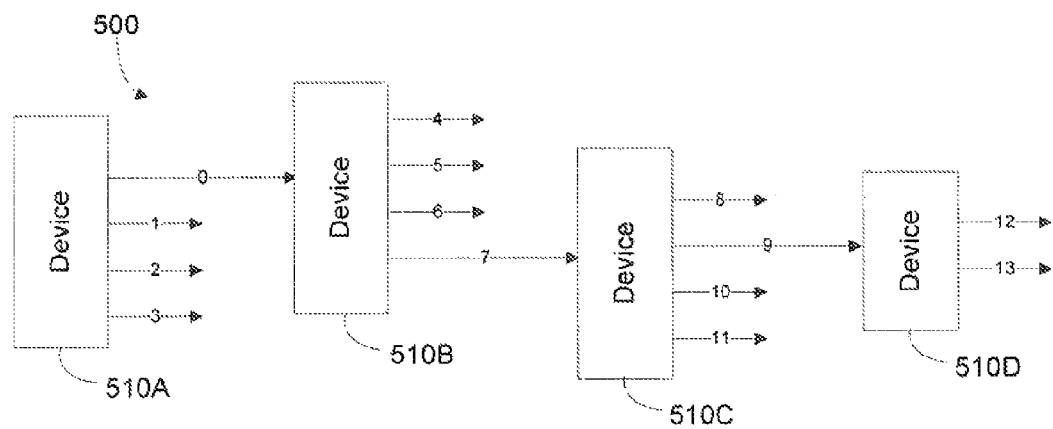
FIG. 5A shows an exemplary multiplexed bus topology in accordance with an exemplary embodiment.
FIG. 5B shows a corresponding data structure for FIG. 5A in accordance with an exemplary embodiment.

FIG. 5A shows an exemplary multiplexed bus topology 500 with four devices 510A-510D coupled together, and FIG. 5B shows the corresponding data structure.

Figures 6A, 6B:
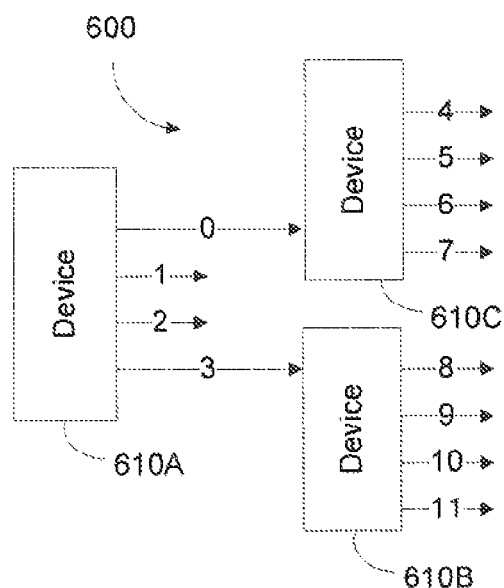
FIG. 6A shows an exemplary multiplexed bus topology in accordance with an exemplary embodiment.
FIG. 6B shows a corresponding data structure for FIG. 6A in accordance with an exemplary embodiment.

FIG. 6A shows an exemplary multiplexed bus topology 600 with three devices 610A-610C coupled together, and FIG. 6B shows the corresponding data structure.

If the system provides data structured to describe the switched bus topology, software can use the data to select the muxes and reach the desired segment.

One type of mux entails a special requirement. An in line mux is a device that is addressed on the bus topology and used to select "downstream" segments. Therefore cascading inline muxes must be switched in order starting closest to the BMC and iteratively until the destination segment.

Figure 7:
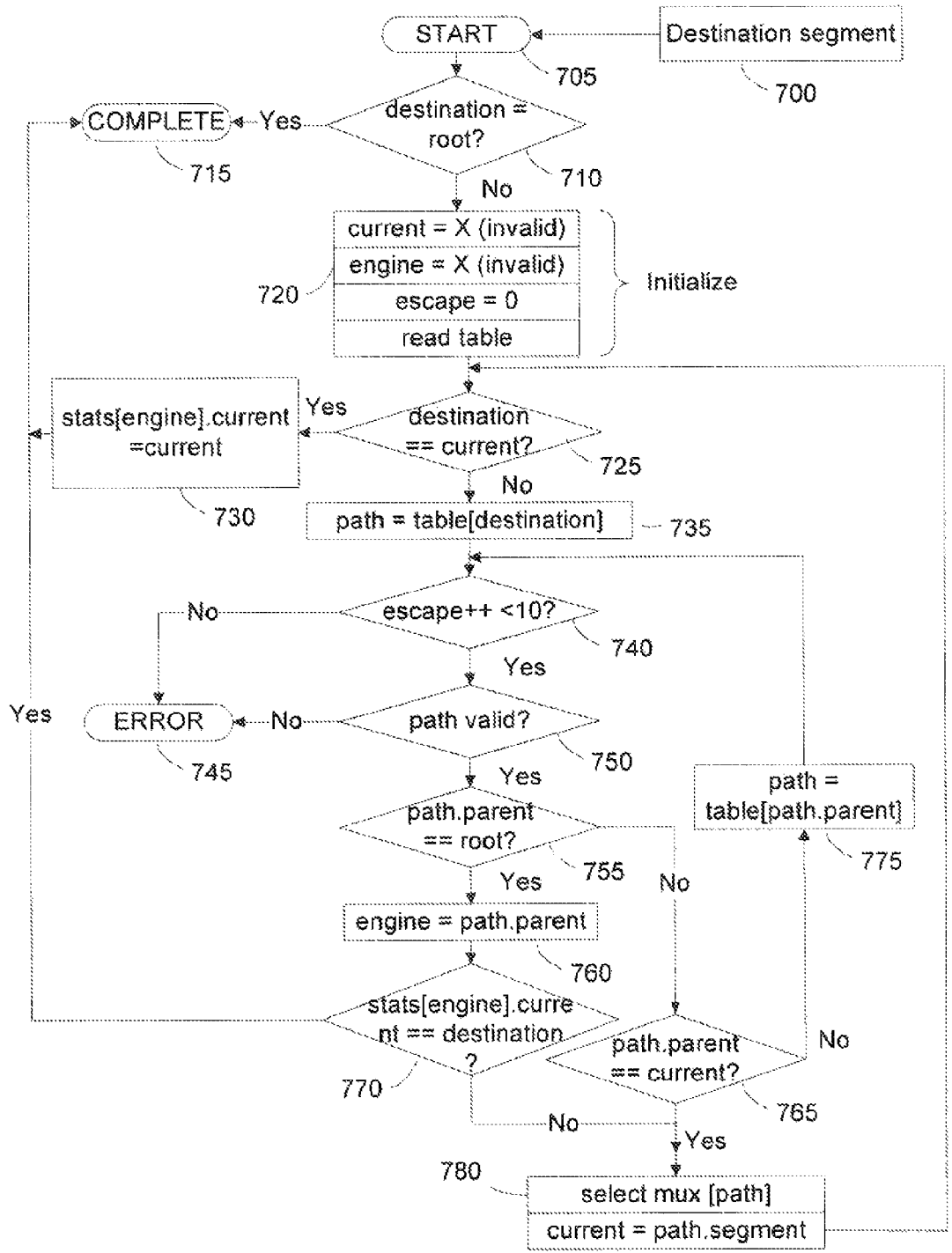
FIG. 7 shows a flow diagram of an algorithm used to select and switch to a destination segment described by a data structure in accordance with an exemplary embodiment.

FIG. 7 shows a flow diagram of an algorithm used to select and switch to a destination segment described by a data structure.

The destination segment (700) is provided and flow commences (705) wherein a determination is made as to whether the destination is the root (710). If yes, then flow is complete (715). If no, then initialization occurs (720) and a determination is made as to whether the destination is current (725). If yes, then stats[engine].current equals current (730). If no, then the path is table[destination] (735). Then if escape ++ is less than 10 (740), determine if the path is valid (750). Otherwise, an error results (745). If the path is valid, then path.parent is root (755) is determined. If yes, then engine is equal to path.parent (760) and a determination is then made as to whether stats[engine].current equals destination (770). If yes, flow is complete (715). If path.parent is not equal to root (755) then a determination is made whether path.parent is current (765). If no, then path equals table[path.parent] (775), and if yes then select the mux[path] and current equals path.segment (780).

DEFINITIONS

As used herein and in the claims, the following words are defined as follows:

The term "address space" means a range of discrete addresses that correspond to a physical or virtual memory register, network host, peripheral device, or other logical or physical entity.

The term "CPLD" or "complex programmable logic device" means an electronic component that is used to build reconfigurable digital circuits and that includes a macro cell containing logic implementing disjunctive normal form expression and other specialized logic operations.

The terms "I2C" or "Inter-Integrated Circuit" means a multi-master serial computer bus that attaches low-speed peripheral devices to a printed circuit board (such as a mother board), embedded system or cellular device. I2C uses two bidirectional open-drain lines, Serial Data (SDA) and Serial Clock (SCL). The system uses a 7-bit address space with 16 reserved addresses to provide a maximum of 112 nodes that communicate on a same bus. The bus has two nodes: a master node which issues clock and address, and the slave node which receives the clock line and address. For example, a master node transmits to a slave node a start bit followed by a 7-bit address of the slave node followed by a single bit to represent write (0) or read (1). The slave node responds with an ACK bit (acknowledge) for that address.

The terms "Integrated Lights Out" (ILO) or "Lights Out Management" (LMO) mean an embedded server management technology that enables a remote electronic device or computer to perform activities on a server from a location remote to the server. For example, an iLO card has a separate network connection and its own IP (Internet Protocol) address to which a user can connect through HTTP (Hyper Text Markup Language) over the Internet. The remote electronic device can perform actions such as reset the server, power-up the server, take over the screen of the server, mount remove physical CD/DVD drives or images, access the server's IML (Integrated Management Log), and provide a remote console for the server. Further, iLO and LOM can be used as an out-of-band management technology.

The term "multiplexer" or "mux" means a switch having multiple-inputs and a single-output. A multiplexer is also a device that performs multiplexing.

The word "multiplexing" means a process where multiple analog message signals or digital data streams are combined into one signal over a shared medium. Multiplexed signals are transmitted over a communication channel, such as a physical transmission medium (for example, a bus). Multiplexing divides a low-level communication channel into several higher-level logical channels with one channel for each message signal or data stream being transferred.

The term "PAL" or "Programmable Array Logic" is a programmable logic device that implements logic functions in digital circuits and includes a PROM (programmable read-only memory) core and output logic to implement logical functions.

The word "primitive" means a process used by software to enact a multiplexer. The primitive describes the nature of selecting a segment, and what steps are needed to perform the selection. For example a general-purpose output could be used to drive the mux select signals. The associated primitive describes the nature of the control (GPO), the control bits that are cleared (clear) and then set (set) to drive the select signals to the mux.

Exemplary embodiments are not limited to any particular type of bus. For example, exemplary embodiments can be implemented on I2C bus, a System Management Bus (SMB) bus, etc.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
segmenting a bus topology into multiple bus segments linked together to increase addressable devices that can attach to a bus, the multiple bus segments comprising switches comprising a first switch having an input and a plurality of first outputs, a first one of the plurality of first outputs directly connected to an input of a second switch having a plurality of second outputs and an addressable device directly connected to a second one of the plurality of first outputs;
selectively connecting the input of the first switch to the input of the second switch or the addressable device; and
using optimizations to determine when switching operations can be avoided in order to address a segment on the bus, the optimizations selected from a group of optimizations consisting of: (1) eliminating unnecessary switching operations upon determining that a target device is already on an addressable segment of one of the buses; (2) eliminating unnecessary switching operations upon determining that a target device resides on a path to a segment that is already switched; and (3) eliminating unnecessary switching operations upon determining that an upstream multiplexer already has a correct selection.

2. The method of claim 1 further comprising: using primitives as descriptions of switching operations to control the first switch and the second switch on the bus to perform the switching operations.

3. The method of claim 1 further comprising, assigning hardware devices attached to the bus to the different segments.

4. The method of claim 1 further comprising, assigning an enumerated segment number to each of the different segments for locating a target device connected to the bus.

5. A tangible computer readable storage medium having instructions for causing a computer to execute a method, comprising:
enacting switches on buses to perform switching operations described in linked primitives, the switching operations switching between different segments on the buses that are divided into the different segments to increase addressable devices that can attach to the buses, wherein the switches comprise:
a first switch having an input and a plurality of first outputs;
a second switch having an input and a plurality of second outputs, the input of the second switch being directly connected to a first one of the plurality of first outputs; and
an addressable device connected to a second one of the plurality of first outputs, wherein the first switch selectively connects the input of the first switch to the input of the second switch or the addressable device; and
eliminating unnecessary switching operations when a target device is already on an addressable segment of one of the buses.

6. The tangible computer readable storage medium of claim 5, wherein the linked primitives describe ordering rules for the switches to switch between the different segments so a controller can communicate with a target device connected to one of the different segments.

7. The tangible computer readable storage medium of claim 5, wherein the buses comprise a segmented topology of the buses having serially linked bus segments with at least one of the serial link bus segments extending from a first one of the switches to a second one of the switches.

8. The tangible computer readable storage medium of claim 5, wherein the linked primitives describe multiple different switching paths along the buses to a target device.

9. A bus system, comprising:
a controller;
a bus coupled to the controller and divided into multiple segments each having a unique segment number for addressing purposes;
plural switches on the bus connected in series by serially linked bus segments, wherein primitives describe ordering rules to enact the plural switches to select different ones of the serially linked bus segments to address devices on the bus, wherein the plural switches comprise:
a first switch having an input and a plurality of first outputs; and
a second switch having an input and a plurality of second outputs, the input of the second switch being directly connected to a first one of the plurality of first outputs; and
an addressable device connected to a second one of the plurality of first outputs, wherein the first switch selectively connects the input of the first switch to the input of the second switch or the addressable device; and
a switching table that provides paths along the serially linked bus segments to target devices.

10. The bus system of claim 9, wherein the primitives associated with a specific serially linked bus segment on the bus describe steps needed to switch to the specific serially linked bus segment.

11. The bus system of claim 9, wherein the bus is an I2C (Inter-Integrated Circuit) bus with more than 112 nodes that communicate on the bus.

12. The bus system of claim 9, wherein the primitives include data used by the controller to select segments to transmit data to a target device on the bus.

13. The method of claim 1, wherein the bus topology is further segmented such that one of the plurality of second outputs is directly connected to an input of a third switch having a plurality of third outputs.

14. The method of claim 1, wherein the bus topology is further segmented such that one of the plurality of second outputs is directly connected to an input of a processor.

15. The bus system of claim 9 further comprising a third switch, wherein one of the plurality of second outputs is directly connected to an input of the third switch having a plurality of third outputs.

16. The bus system of claim 9 further comprising a processor, wherein one of the plurality of second outputs is directly connected to an input of the processor.

* * * * *